(12) United States Patent
Lee

(10) Patent No.: US 12,206,578 B2
(45) Date of Patent: Jan. 21, 2025

(54) AGGREGATION PACKET FORWARDING METHOD AND AGGREGATION PACKET FORWARDING SYSTEM

(71) Applicant: REALTEK SEMICONDUCTOR CORP., Hsinchu (TW)

(72) Inventor: Chen-Wei Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/385,958

(22) Filed: Nov. 1, 2023

(65) Prior Publication Data

US 2024/0259304 A1 Aug. 1, 2024

(30) Foreign Application Priority Data

Jan. 31, 2023 (TW) ................................. 112103215

(51) Int. Cl.
*G06F 15/16* (2006.01)
*H04L 45/00* (2022.01)

(52) U.S. Cl.
CPC ............ *H04L 45/566* (2013.01); *H04L 45/54* (2013.01); *H04L 45/66* (2013.01)

(58) Field of Classification Search
CPC ........ H04L 45/54; H04L 45/66; H04L 45/566
USPC ......................................................... 709/238
See application file for complete search history.

(56) References Cited

U.S. PATENT DOCUMENTS

| | | | |
|---|---|---|---|
| 6,721,334 B1 | 4/2004 | Ketcham | |
| 9,384,033 B2* | 7/2016 | Jain | ..................... G06F 9/45558 |
| 9,672,189 B2* | 6/2017 | Raz | ......................... H04L 9/088 |
| 9,742,682 B2* | 8/2017 | Jain | ......................... H04L 47/36 |
| 9,755,981 B2* | 9/2017 | Jain | ........................... G06F 9/00 |
| 10,298,494 B2* | 5/2019 | Kamper | ................ H04L 69/166 |
| 10,313,926 B2* | 6/2019 | Mehta | ................. G06F 9/45558 |
| 10,467,161 B2* | 11/2019 | Gilboa | .................... G06F 13/24 |
| 10,645,200 B2* | 5/2020 | Gil | ......................... G06F 13/128 |
| 10,680,964 B1* | 6/2020 | Kadosh | ................... H04L 47/41 |
| 11,595,472 B2* | 2/2023 | Gerlitz | .................. H04L 43/062 |
| 11,876,859 B2* | 1/2024 | Gerlitz | .................... H04L 67/14 |
| 2015/0261556 A1* | 9/2015 | Jain | ........................ H04L 49/70 |
| | | | 718/1 |

(Continued)

*Primary Examiner* — Moustafa M Meky
(74) *Attorney, Agent, or Firm* — Li & Cai Intellectual Property (USA) Office

(57) ABSTRACT

An aggregation packet forwarding method and a system for the same are provided. The method includes: configuring a first NIC to transmit to-be-forwarded packets to an aggregation module; configuring the aggregation module to generate an aggregated packet according to packet characteristics of the to-be-forwarded packets; configuring a first processing unit to execute a first NIC driver to process the aggregated packet generated by the aggregation module and send them to an L2 forwarding module; configuring the L2 forwarding module to transmit the aggregated packet according to an L2 forwarding table; configuring a second processing unit to execute a second NIC driver to process the aggregated packet and send the aggregated packet to a deaggregation module; configuring the deaggregation module to deaggregate the aggregated packet into the to-be-forwarded packets, and send the to-be-forwarded packets to the second NIC; and configuring the second NIC to receive the to-be-forwarded packets.

16 Claims, 7 Drawing Sheets

(56) References Cited

U.S. PATENT DOCUMENTS

| | | | |
|---|---|---|---|
| 2015/0263968 A1* | 9/2015 | Jain | G06F 9/00 370/235 |
| 2015/0263974 A1* | 9/2015 | Jain | H04L 47/36 370/229 |
| 2016/0142307 A1* | 5/2016 | Kamper | H04L 47/70 709/238 |
| 2020/0169510 A1* | 5/2020 | Kadosh | H04L 47/215 |
| 2022/0217085 A1* | 7/2022 | Sankar | H04L 49/254 |
| 2022/0232072 A1* | 7/2022 | Gerlitz | H04L 67/01 |
| 2022/0368644 A1* | 11/2022 | Kato | H04L 47/41 |
| 2023/0141761 A1* | 5/2023 | Gerlitz | H04L 67/1044 709/224 |

* cited by examiner

Pa'

| 802.3 SNAP | 802.3 SNAP | 802.3 SNAP | 802.3 SNAP | 802.3 SNAP |
|---|---|---|---|---|

FIG. 6

AGGREGATION PACKET FORWARDING METHOD AND AGGREGATION PACKET FORWARDING SYSTEM

CROSS-REFERENCE TO RELATED PATENT APPLICATION

This application claims the benefit of priority to Taiwan Patent Application No. 112103215, filed on Jan. 31, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a forwarding method and a forwarding system, and more particularly to an aggregation packet forwarding method and an aggregation packet forwarding system.

BACKGROUND OF THE DISCLOSURE

With an evolution of networks, the network transmission rate is getting higher and higher, while general routers (such as WI-FI access points/routers) are limited in performance as embedded platforms. With limited processor performance, the conversion rate will be affected by a processor speed, especially for transmission applications between the Ethernet and WI-FI, and the complexity of WI-FI protocols also greatly increases processor loads required for packet forwarding. This phenomenon also affects performance of routers, so that maximizing the performance of WI-FI access points or routers with limited hardware resources has become a major challenge.

There are two existing manners to effectively improve the performance of WI-FI access points or routers. The first manner is to use a platform with a faster or multicore processor to distribute the workload for parallel processing. However, this approach will result in high hardware costs as transmission rates increase. In addition, the load balancing of forwarding tasks will also affect overall performance.

The second method is hardware offloading, which involves offloading some of the forwarding tasks to hardware to reduce the processor loads and improve performance. However, due to the complexity of WI-FI protocols, many functions are difficult to implement effectively by hardware offloading.

SUMMARY OF THE DISCLOSURE

In response to the above-referenced technical inadequacies, the present disclosure provides an aggregation packet forwarding method and an aggregation packet forwarding system, which uses an aggregation packet conversion mechanism to combine, based on characteristics of to-be-forwarded packets, multiple packets with the same characteristics into an aggregated packet, and the aggregated packet is then forwarded, so as to reduce a packet forwarding rate and improve the overall forwarding efficiency.

In one aspect, the present disclosure provides an aggregation packet forwarding method, which includes: configuring a first network interface controller (NIC) to transmit a plurality of to-be-forwarded packets to an aggregation module; configuring the aggregation module to combine at least a part of the plurality of to-be-forwarded packets to generate an aggregated packet according to a plurality of packet characteristics of the to-be-forwarded packets; configuring a first processing unit to execute a first NIC driver to process the aggregated packet generated by the aggregation module, and transmit the aggregated packet to a Layer 2 (L2) forwarding module; configuring the L2 forwarding module to transmit the aggregated packet according to an L2 forwarding table; configuring a second processing unit to execute a second NIC driver to process the aggregated packet transmitted by the L2 forwarding module, and transmit the aggregated packet to a deaggregation module; configuring the deaggregation module to deaggregate the aggregated packet into the plurality of to-be-forwarded packets, and send the to-be-forwarded packets to a second NIC; and configuring the second NIC to receive the to-be-forwarded packets.

In another aspect, the present disclosure provides an aggregation packet forwarding system, which includes a first network interface controller (NIC), an aggregation module, and a first NIC Driver, a Layer 2 (L2) forwarding module, a second NIC driver, a deaggregation module and a second NIC. The first NIC is configured to transmit a plurality of to-be-forwarded packets. The aggregation module is configured to receive the plurality of to-be-forwarded packets, and combine at least a part of the plurality of to-be-forwarded packets to generate an aggregated packet according to a plurality of packet characteristics of the to-be-forwarded packets. The first NIC driver is executed by a first processing unit to receive and process the aggregated packet transmitted by the aggregation module. The L2 forwarding module is configured to receive the aggregated packet processed by the first NIC driver, and transmit the aggregated packet according to an L2 forwarding table. The second NIC driver executed by a second processing unit to receive and process the aggregated packet transmitted by the L2 forwarding module. The deaggregation module is configured to receive the aggregated packet processed by the second NIC driver, and deaggregate the aggregated packet into the to-be-forwarded packets for transmission. The second NIC is configured to receive the to-be-forwarded packets.

Therefore, in the aggregation packet forwarding method and the aggregation packet forwarding system provided by the present disclosure, based on characteristics of to-be-forwarded packets, multiple packets with the same characteristics can be combined into one aggregated packet, and the aggregated packet can then be forwarded, so as to reduce a packet forwarding rate and improve the overall forwarding efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a schematic diagram of an aggregated packet in a second target format according to one embodiment of the present disclosure.

DETAILED DESCRIPTION OF THE EXEMPLARY EMBODIMENTS

Figure 1:
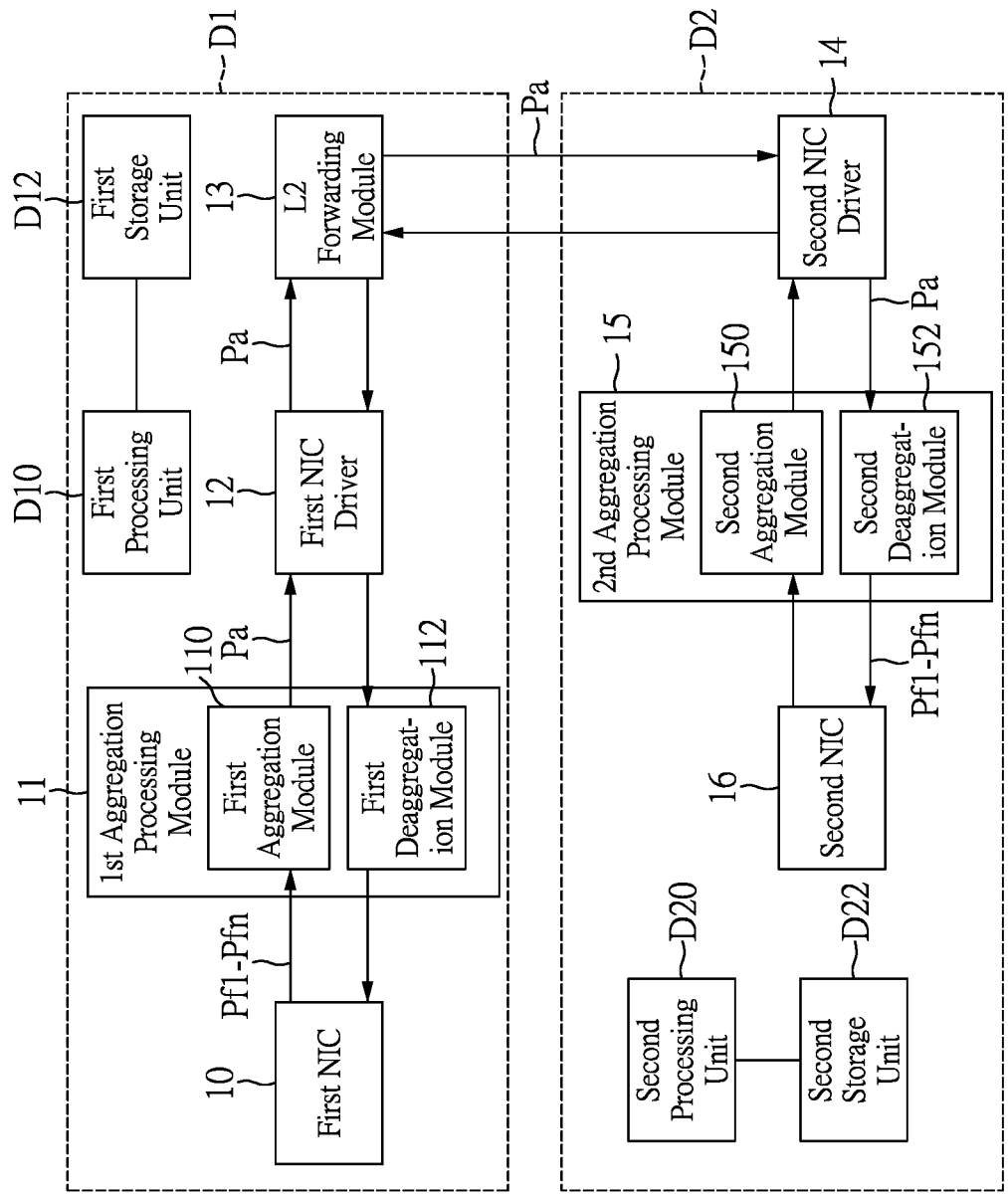
FIG. 1 is a schematic diagram of an aggregation packet forwarding system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic diagram of an aggregation packet forwarding system according to one embodiment of the present disclosure. Reference is made to FIG. 1, a first embodiment of the present disclosure provides an aggregation packet forwarding system 1, which is applicable to a first electronic device D1 and a second electronic device D2 that are communicatively connected with each other. The aggregated packet forwarding system 1 mainly includes a first network interface controller (NIC) 10, a first aggregate processing module 11, a first NIC driver 12, a Layer 2 (L2) forwarding module 13, a second NIC driver 14, a second aggregation processing module 15, and a second NIC 16. The first aggregation processing module 11 includes a first aggregation module 110 and a first deaggregation module 112, and the second aggregation processing module 15 includes a second aggregation module 150 and a second deaggregation module 152. It should be noted that a configuration of the first aggregation processing module 11 and the second aggregation processing module 15 is used to meet requirements of two-way forwarding, but the present disclosure is not limited thereto. In the case that the forwarding is only performed in a direction from the first NIC 10 to the second NIC 16, the first aggregation processing module 11 can only include the first aggregation module 110, and the second aggregation processing module 15 can only include the second deaggregation module 152. In the case that the forwarding is only performed in another direction from the second NIC 16 to the first NIC 10, the first aggregation processing module 11 can only include the first deaggregation module 112, and the second aggregation processing module 15 can only include the second aggregation module 150.

As mentioned above, the first electronic device D1 and the second electronic device D2 can be, for example, wireless access points, routers, servers or general computer systems, but the present disclosure is not limited thereto. The first electronic device D1 and the second electronic device D2 can be communicatively connected to each other through a physical link or a wireless link between the first NIC 10 and the second NIC 16. In this embodiment, the first electronic device D1 can include a first processing unit D10 and a first storage unit D12, and the first processing unit D10 can execute a first NIC driver 12 corresponding to the first NIC 10 to process signal operations between a physical layer, a data link layer (including a MAC layer and an LLC layer), a network layer and a transport layer, for which only modules involved in the forwarding are described in detail in embodiments of the present disclosure to avoid losing focus. Similarly, the second electronic device D2 can include a second processing unit D20 and a second storage unit D22, and the second processing unit D20 can execute a second NIC driver 14 corresponding to the second NIC 16.

The first processing unit D10 and the second processing unit D2 can be, for example, processors, which can be, for example, central processing units (CPUs) and/or general-purpose microprocessors, microcontrollers, digital signal processors (DSPs), field programmable gate arrays (FPGAs), programmable logic device (PLD), any combination of controllers, or any other suitable circuit, equipment and/or structures.

The first storage unit D12 and the second storage unit D22 can be, for example, but not limited to, hard disks, solid state disks (SSDs) or other storage devices that can store data. The first storage unit D12 and the second storage unit D22 are configured to store at least a plurality of computer-readable instructions.

Figure 2:
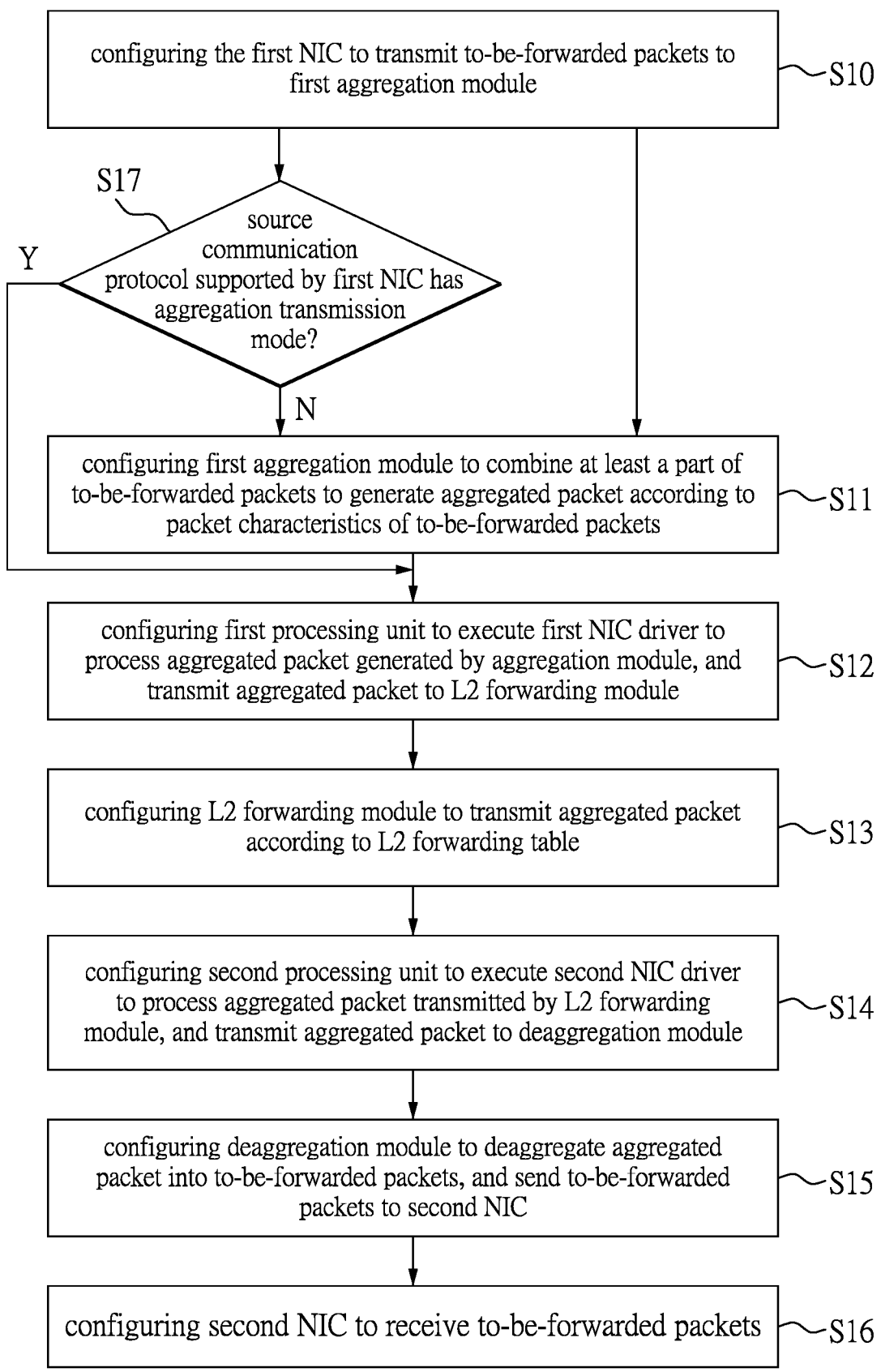
FIG. 2 is a first flowchart of an aggregation packet forwarding method according to one embodiment of the present disclosure.

Reference is made to FIG. 2, which is a first flowchart of an aggregation packet forwarding method according to one embodiment of the present disclosure. As shown in FIG. 2, one embodiment of the present disclosure provides an aggregation packet forwarding method, which is applicable to the aggregation packet forwarding system 1 shown in FIG. 1, but the present disclosure is not limited thereto.

As shown in FIG. 2, the aggregation packet forwarding method can include the following steps:

Step S10: configuring the first NIC to transmit a plurality of to-be-forwarded packets to the first aggregation module. For example, after the first electronic device D1 transmits to-be-forwarded packets to the first NIC, the first NIC transmits the to-be-forwarded packets Pf1-Pfn to the first aggregation module 110 in response to receiving the to-be-forwarded packets Pf1-Pfn.

Step S11: configuring the first aggregation module to combine at least a part of the plurality of to-be-forwarded packets to generate an aggregated packet according to a plurality of packet characteristics of the to-be-forwarded packets. For example, the first aggregation module 110 can combine the to-be-forwarded packets Pf1-Pfn into an aggregated packet Pa and send it to the NIC1 driver. In detail, this step can convert a forwarding unit of the packets from a single packet to an aggregated packet Pa that combines multiple packets, which will improve a forwarding efficiency between the first NIC driver 12, the L2 forwarding module 13 and the second NIC driver 14 proportionally according to a quantity of packets that are aggregated into the aggregated packet Pa.

Figure 3:
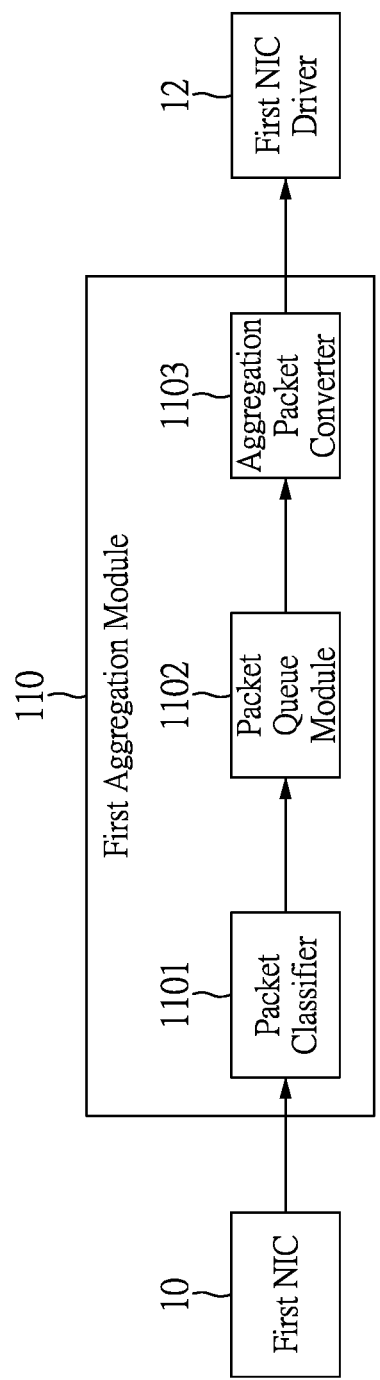
FIG. 3 is a schematic block diagram showing a first NIC, a first aggregation module, and a first NIC driver according to one embodiment of the present disclosure.
Figure 4:
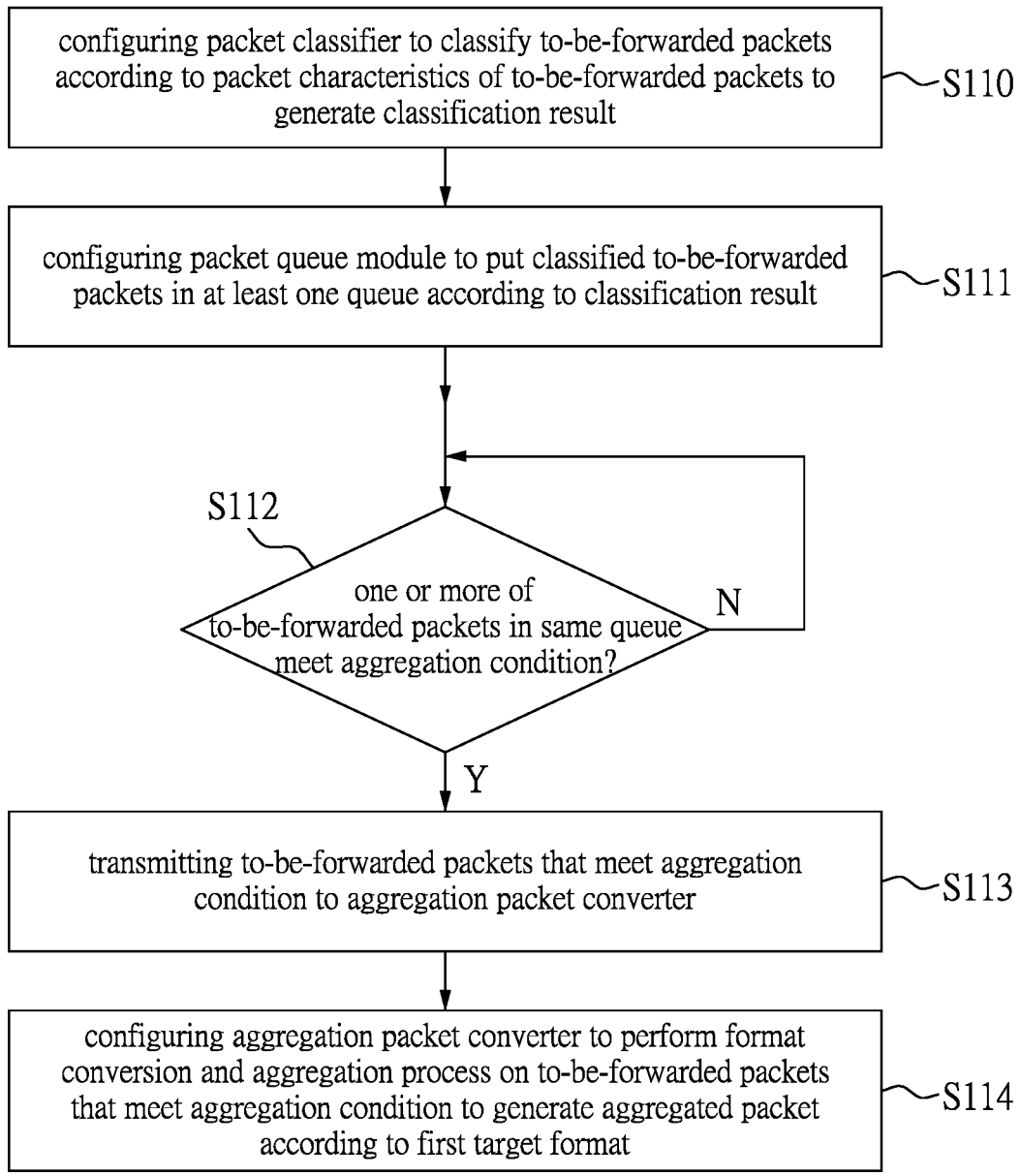
FIG. 4 is a second flowchart of the aggregation packet forwarding method according to one embodiment of the present disclosure.

Reference is made to FIGS. 3 and 4, FIG. 3 is a schematic block diagram showing a first NIC, a first aggregation module, and a first NIC driver according to one embodiment of the present disclosure, and FIG. 4 is a second flowchart of the aggregation packet forwarding method according to one embodiment of the present disclosure.

As shown in FIG. 3, the first aggregation module 110 includes a packet classifier 1101, a packet queue module 1102 and an aggregation packet converter 1103. It should be noted that the above-mentioned first aggregation module 110 and the packet classifier 1101, packet queue module 1102, and the aggregation packet converter 1103 can be implemented in a form of software, hardware or firmware. In the form of software, the plurality of computer-readable instructions stored in the first storage unit D12 can be executed by the first processing unit D10 to realize functions of the above-mentioned first aggregation module 110 and the packet classifier 1101, packet queue module 1102, and the aggregation packet converter 1103. In order to further improve a utilization rate of the first processing unit D10 (that is, to reduce a load rate), the first aggregation module 110 and the packet classifier 1101, the packet queue module 1102, and the aggregated packet conversion module 1103 can be designed as additional circuits, or can be implemented by using a processing unit with a lower cost, and the present disclosure does not limit the implementations thereof.

The purpose of the packet classifier 1101, the packet queue module 1102 and the aggregation packet converter 1103 will be described in detail hereinafter with reference to FIG. 4. As shown in FIG. 4, step S11 can include:

Step S110: configuring the packet classifier to classify to-be-forwarded packets according to the packet characteristics of the to-be-forwarded packets, so as to generate a classification result.

In detail, in this step, the aggregation can be performed according to characteristics of the to-be-forwarded packets Pf1-Pfn. For example, the packet characteristics according to which the packet classifier 1101 performs classification can include one or more of a destination address, a destination NIC port, and a QoS priority, but the present disclosure is not limited thereto. The above-mentioned packet characteristics are merely used to describe possible targets of the packet classifier 1101.

Taking the destination address as an example, the packet classifier 1101 can, for example, consider classifying and aggregating the to-be-forwarded packets Pf1-Pfn having the same destination address, so as to generate the aggregated packet Pa.

Taking the destination NIC port as an example, the packet classifier 1101 can, for example, consider that the to-be-forwarded packets Pf1-Pfn will ultimately be forwarded to the same NIC card; therefore, ones with the same destination NIC port among the to-be-forwarded packets Pf1-Pfn can be classified and aggregated, and in such manner, a classification needs to be performed based on an L2 forwarding table used in a subsequent forwarding performed by the L2 forwarding module 13, so as to generate the aggregated packet Pa.

Taking the QoS priority as an example, the packet classifier 1101 can, for example, classify and aggregate the to-be-forwarded packets according to a differentiated services code point (DSCP) field of IP headers of the packets, so as to generate the aggregated packet Pa. The DSCP field is in a TOS identification byte group of the service class in each of the IP packet headers, and uses coded values to classify a service class and distinguish a priority of the service. However, the above-mentioned example is merely one of feasible embodiments, and is not intended to limit the present disclosure. The packet classifier 1101 can also consider a combination of the above-mentioned packet characteristics to generate the aggregated packet Pa.

Step S111: configuring the packet queue module to put the classified to-be-forwarded packets in at least one queue according to the classification result. In detail, after the packets of the same type are classified by the packet classifier 1101, the classified packets will be handed over to the packet queue module 1102 to put the packets in the same queue.

Step S112: determining whether or not one or more of the to-be-forwarded packets in the same queue meet an aggregation condition. In this step, the packet queue module 1102 can set different aggregation conditions according to different applications. When the to-be-forwarded packets accumulated in the same queue meet the aggregation condition, the packet queue module 1102 will further take the to-be-forwarded packets from the queue that meet the aggregation condition.

In some embodiments, the aggregation condition includes one or more of a predetermined quantity of packets, a predetermined size of a packet, and a predetermined timeout time. The predetermined quantity of packets and the predetermined size of the packet can be set according to an amount of data allowed to be transmitted per unit of time and a processing capacity, and the predetermined timeout time is used to avoid spending too much time on waiting for meeting the aggregation condition, which may lead to packet delays that reduce a transmission rate.

In response to determining that the one or more of the to-be-forwarded packets in the same queue meet the aggregation condition, the method proceeds to step S113: transmitting the one or more of the to-be-forwarded packets that meet the aggregation condition to the aggregation packet converter. For example, when the to-be-forwarded packets accumulated in the same queue reach the predetermined quantity of packets or the predetermined size of packets, or when an elapsed time in the queue exceeds the predetermined timeout time, the packet queue module 1102 can send the to-be-forwarded packets in the queue to the aggregation packet converter 1103.

If it is determined in step S112 that one or more to-be-forwarded packets in the same queue do not meet the aggregation condition, step S112 is repeated until the aggregation condition is met, and then the method proceeds to step S113.

Figure 5:
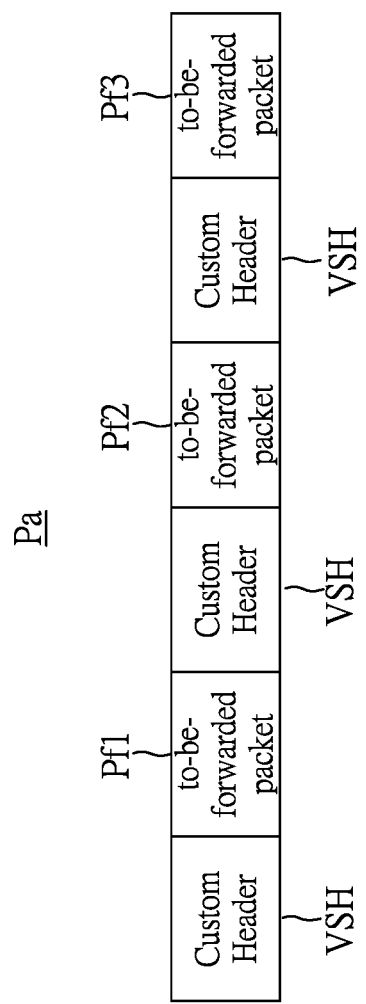
FIG. 5 is a schematic diagram of an aggregated packet in a first target format according to one embodiment of the present disclosure.

After step S113, the method proceeds to step S114: configuring the aggregation packet converter to perform a format conversion and aggregation process on the one or more of the to-be-forwarded packets that meet the aggregation condition, so as to generate the aggregated packet according to a first target format. For example, reference can be made to FIG. 5, which is a schematic diagram of an aggregated packet in a first target format according to one embodiment of the present disclosure. In this step, the first target format can, for example, have an arrangement that a vendor-specific header needs to be inserted in front of each of the to-be-forwarded packets. Therefore, as shown in FIG. 5, the aggregation packet converter 1103 can add a custom header VSH in front of each of the to-be-forwarded packets (such as the to-be-forwarded packets Pf1, Pf2, and Pf3) taken out in step S112, and combine them to generate the aggregated packet Pa according to the first target format. It should be noted that this first target format will be used as a basis for the second deaggregation module 152 to deaggregate the aggregated packet Pa subsequently, but the first target format is not limited thereto, as long as the first target format is a format that can be successfully deaggregated by the second deaggregation module 152.

In a specific embodiment, step S114 can also include configuring the aggregated packet converter 1103 to convert, according to a target communication protocol of the destination NIC port, the to-be-forwarded packets that meet the aggregation condition into a second target format that is compatible with the target communication protocol.

For example, when the to-be-forwarded packets Pf1-Pfn are classified according the destination NIC port, the aggregation packet converter 1103 can also design a format of the aggregated packet according to a protocol of the destination NIC port of the forwarding. For example, reference can be made to FIG. 6, which is a schematic diagram of an aggregated packet in a second target format according to one embodiment of the present disclosure. If the destination NIC port is a WI-FI NIC, the aggregation packet converter 1103 can convert, according to the format of an aggregated MAC service data unit (AMSDU) packet defined by the WI-FI specification, multiple packets into consecutive multiple aggregated packets in the sub-network access protocol (SNAP) format defined in the IEEE 802.3 specification. After the WI-FI NIC driver receives the aggregated packet Pa, the packet can be easily converted into an AMSDU packet Pa', as illustrated in FIG. 6. After converting to a format supported by the WI-FI protocol, the design of the second deaggregation module 152 can be further simplified.

Step S12: configuring the first processing unit to execute the first NIC driver to process the aggregated packet generated by the aggregation module, and transmit the aggregated packet to the L2 forwarding module. In this step, the first NIC driver 12 processes the aggregated packet Pa in the downstream direction (direction from the first NIC 10 to the second NIC 16).

Step S13: configuring the L2 forwarding module to transmit the aggregated packet according to an L2 forwarding table. Taking Ethernet switching as an example, the L2 forwarding module 13 can be responsible for address learning and message forwarding of Ethernet messages. The L2 forwarding module 13 can be implemented by an L2 forwarding table (for example, a MAC address table) and corresponding logical functions such as address learning, searching, and aging. The L2 forwarding table stores MAC addresses, and generally includes correspondence between other address information such as VLAN IDs and ports.

Step S14: configuring the second processing unit to execute the second NIC driver to process the aggregated packet transmitted by the L2 forwarding module, and transmit the aggregated packet to the deaggregation module. Similarly, the second NIC driver 14 can process the aggregated packet Pa in the downstream direction (direction from the first NIC 10 to the second NIC 16).

Figure 7:
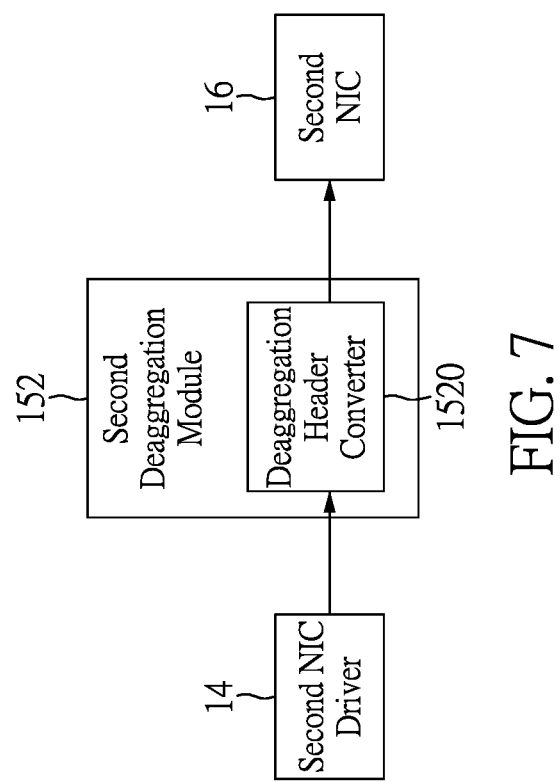
FIG. 7 is a schematic block diagram showing a second NIC driver, a second deaggregation module, and a second NIC according to one embodiment of the present disclosure.

Step S15: configuring the deaggregation module to deaggregate the aggregated packet into the plurality of to-be-forwarded packets, and send the to-be-forwarded packets to the second NIC. Reference is made to FIG. 7, which is a schematic block diagram showing a second NIC driver, a second deaggregation module, and a second NIC according to one embodiment of the present disclosure.

As shown in FIG. 7, the second deaggregation module 152 includes a deaggregation header converter 1520, and step S15 can include configuring the deaggregation header converter 1520 to deaggregate the aggregated packet Pa according to the first target format, and to convert the to-be-forwarded packets according to the second target format compatible with the second NIC 16. It should be noted that the above-mentioned second deaggregation module 152 and the deaggregation header converter 1520 included therein can be implemented in a form of software, hardware or firmware. In the form of software, the plurality of computer-readable instructions stored in the second storage unit D22 can be executed by the second processing unit D20 to realize functions of the above-mentioned second deaggregation module 152 and the deaggregation header converter 1520. In order to further improve a utilization rate of the second processing unit D20 (that is, to reduce the load rate), the second deaggregation module 152 and the deaggregation header converter 1520 included therein can be designed as additional circuits, or can be implemented by using a processing unit with a lower cost, and the present disclosure does not limit the implementations thereof.

In FIG. 7, the deaggregation header converter 1520 mainly converts the aggregated packet Pa back to a second target format that can be accepted by the second NIC 16 according to the first target format used to generate the aggregated packet Pa from the aggregation packet converter 1103 of the first aggregation module 110. For example, if the destination NIC (i.e., the second NIC 16) is an Ethernet network, then the deaggregation header converter 1520 can convert the aggregated packet Pa into the to-be-forwarded Packets Pf1-Pfn in a form of Ethernet Type II.

Step S16: configuring the second NIC to receive the to-be-forwarded packets. For example, after the deaggregation header converter 1520 generates the to-be-forwarded packets Pf1-Pfn in the form of Ethernet Type II, the to-be-forwarded packets Pf1-Pfn in the form of Ethernet Type II can be transmitted to the second NIC 16 in sequence.

In other embodiments, when there is an aggregated packet transmission mode in a communication protocol used by the first NIC 10 (such as the aforementioned AMSDU packet in the WI-FI specification), the first aggregation module 110 can be ignored in the downlink transmission direction, and the aggregated packet in the original communication protocol used by the first NIC 10 can be directly forwarded to the second deaggregation module 152 for deaggregating the aggregated packet.

Therefore, the aggregated packet forwarding method can further include step S17: determining whether or not a source communication protocol supported by the first NIC has an aggregation transmission mode. If the affirmative, the method can skip step S11 and directly proceed to steps S12, S13, S14, S15, such that the to-be-forwarded packets Pf1-

Pfn can be directly taken as multiple aggregated packets Pa, which are then transmitted, through the first NIC driver, the L2 forwarding module and the second NIC driver, to the deaggregation module 152 for deaggregation. If the negative, the method proceeds to step S11.

In addition, for an uplink transmission direction, functions and details of the first deaggregation module 112 and the second aggregation module 150 are the same as those of the second deaggregation module 152 and the first aggregation module 110, respectively, and the first deaggregation module 112 and the second aggregation module 150 are mainly used to realize a two-way aggregated packet forwarding architecture between the first NIC 10 and the second NIC 16, and thus repeated descriptions are omitted herefrom.

Beneficial Effects of the Embodiments

In conclusion, in the aggregation packet forwarding method and the aggregation packet forwarding system provided by the present disclosure, based on characteristics of to-be-forwarded packets, multiple packets with the same characteristics can be combined into one aggregated packet, and the aggregated packet can then be forwarded, so as to reduce a packet forwarding rate and improve the overall forwarding efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An aggregation packet forwarding method, comprising:
    configuring a first network interface controller (NIC) to transmit a plurality of to-be-forwarded packets to an aggregation module;
    configuring the aggregation module to combine at least a part of the plurality of to-be-forwarded packets to generate an aggregated packet according to a plurality of packet characteristics of the to-be-forwarded packets;
    configuring a first processing unit to execute a first NIC driver to process the aggregated packet generated by the aggregation module, and transmit the aggregated packet to a Layer 2 (L2) forwarding module;
    configuring the L2 forwarding module to transmit the aggregated packet according to an L2 forwarding table;
    configuring a second processing unit to execute a second NIC driver to process the aggregated packet transmitted by the L2 forwarding module, and transmit the aggregated packet to a deaggregation module;
    configuring the deaggregation module to deaggregate the aggregated packet into the plurality of to-be-forwarded packets, and send the to-be-forwarded packets to a second NIC; and
    configuring the second NIC to receive the to-be-forwarded packets.

2. The aggregated packet forwarding method according to claim 1, wherein the aggregation module includes a packet classifier, a packet queue module, and an aggregation packet converter, and the step of configuring the aggregation module to combine the at least part of the to-be-forwarded packets to generate the aggregated packet according to the packet characteristics of the to-be-forwarded packets further includes:
    configuring the packet classifier to classify to-be-forwarded packets according to the packet characteristics of the to-be-forwarded packets, so as to generate a classification result;
    configuring the packet queue module to put the classified to-be-forwarded packets in at least one queue according to the classification result, and determine whether or not one or more of the to-be-forwarded packets in the same queue meet an aggregation condition;
    in response to determining that the one or more of the to-be-forwarded packets in the same queue meet the aggregation condition, transmitting the one or more of the to-be-forwarded packets that meet the aggregation condition to the aggregation packet converter; and
    configuring the aggregation packet converter to perform a format conversion and aggregation process on the one or more of the to-be-forwarded packets that meet the aggregation condition, so as to generate the aggregated packet according to a first target format.

3. The aggregation packet forwarding method according to claim 2, wherein each of the packet characteristics, according to which the packet classifier performs classification, includes one or more of a destination address, a destination NIC port, and a QoS priority.

4. The aggregation packet forwarding method according to claim 2, wherein the aggregation condition includes one or more of a predetermined quantity of packets, a predetermined size of a packet, and a predetermined timeout time.

5. The aggregation packet forwarding method according to claim 2, wherein the format conversion and aggregation process includes:
    adding a custom header in front of each of the one or more of the to-be-forwarded packets that meet the aggregation condition, and combining the one or more of the to-be-forwarded packets that meet the aggregation condition to generate the aggregated packet according to the first target format.

6. The aggregation packet forwarding method according to claim 2, wherein the deaggregation module includes a deaggregation header converter, and the step of configuring the deaggregation module to deaggregate the aggregated packet into the plurality of to-be-forwarded packets include:
    configuring the deaggregation header converter to deaggregate the aggregated packet into the to-be-forwarded packets according to the first target format, and perform conversion on the to-be-forwarded packets according to a second target format compatible with the second NIC.

7. The aggregation packet forwarding method according to claim 2, wherein the format conversion and aggregation process includes:
    converting, according to a target communication protocol of the destination NIC port, the to-be-forwarded packets that meet the aggregation condition into a second target format compatible with the target communication protocol.

8. The aggregation packet forwarding method according to claim 1, further comprising:
    configuring the aggregation module to further determine whether or not a source communication protocol supported by the first NIC has an aggregation transmission mode, and in the affirmative, directly taking the to-be-forwarded packets as multiple ones of the aggregated packet to be transmitted, through the first NIC driver, the L2 forwarding module and the second NIC driver, to the deaggregation module for deaggregation.

9. An aggregation packet forwarding system, comprising:
a first network interface controller (NIC) configured to transmit a plurality of to-be-forwarded packets;
an aggregation module configured to receive the plurality of to-be-forwarded packets, and combine at least a part of the plurality of to-be-forwarded packets to generate an aggregated packet according to a plurality of packet characteristics of the to-be-forwarded packets;
a first NIC driver executed by a first processing unit to receive and process the aggregated packet transmitted by the aggregation module;
a Layer 2 (L2) forwarding module configured to receive the aggregated packet processed by the first NIC driver, and transmit the aggregated packet according to an L2 forwarding table;
a second NIC driver executed by a second processing unit to receive and process the aggregated packet transmitted by the L2 forwarding module;
a deaggregation module configured to receive the aggregated packet processed by the second NIC driver, and deaggregate the aggregated packet into the to-be-forwarded packets for transmission; and
a second NIC configured to receive the to-be-forwarded packets.

10. The aggregated packet forwarding system according to claim 9, wherein the aggregation module includes a packet classifier, a packet queue module, and an aggregation packet converter, and when the aggregation module is configured to combine the at least part of the to-be-forwarded packets to generate the aggregated packet according to the packet characteristics of the to-be-forwarded packets, the packet classifier is configured to classify to-be-forwarded packets according to the packet characteristics of the to-be-forwarded packets to generate a classification result, the packet queue module is configured to put the classified to-be-forwarded packets in at least one queue according to the classification result, and determine whether or not one or more of the to-be-forwarded packets in the same queue meet an aggregation condition;
wherein, in response to determining that the one or more of the to-be-forwarded packets in the same queue meet an aggregation condition, the packet queue module transmits the one or more of the to-be-forwarded packets that meet the aggregation condition to the aggregation packet converter, and the aggregation packet converter is configured to perform a format conversion and aggregation process on the one or more of the to-be-forwarded packets that meet the aggregation condition, so as to generate the aggregated packet according to a first target format.

11. The aggregation packet forwarding system according to claim 10, wherein each of the packet characteristics according to which the packet classifier performs classification, includes one or more of a destination address, a destination NIC port, and a QoS priority.

12. The aggregation packet forwarding system according to claim 10, wherein the aggregation condition includes one or more of a predetermined quantity of packets, a predetermined size of a packet, and a predetermined timeout time.

13. The aggregation packet forwarding system according to claim 10, wherein the format conversion and aggregation process includes:
adding a custom header in front of each of the one or more of the to-be-forwarded packets that meet the aggregation condition, and then combining the one or more of the to-be-forwarded packets that meet the aggregation condition to generate the aggregated packet according to the first target format.

14. The aggregation packet forwarding system according to claim 10, wherein the deaggregation module includes a deaggregation header converter, and when the deaggregation module is configured to deaggregate the aggregated packet into the plurality of to-be-forwarded packets, the deaggregation header converter is configured to deaggregate the aggregated packet into the to-be-forwarded packets according to the first target format, and perform conversion on the to-be-forwarded packets according to a second target format compatible with the second NIC.

15. The aggregation packet forwarding system according to claim 10, wherein the format conversion and aggregation process includes:
converting, according to a target communication protocol of the destination NIC port, the to-be-forwarded packets that meet the aggregation condition into a second target format compatible with the target communication protocol.

16. The aggregation packet forwarding system according to claim 9, wherein, the aggregation module is further configured to determine whether or not a source communication protocol supported by the first NIC has an aggregation transmission mode, and in the affirmative, directly taking the to-be-forwarded packets as multiple ones of the aggregated packet to be transmitted, through the first NIC driver, the L2 forwarding module and the second NIC driver, to the deaggregation module for deaggregation.

* * * * *